(No Model.)  2 Sheets—Sheet 1.
J. D. EVERETT.
VEHICLE WHEEL.
No. 509,883. Patented Dec. 5, 1893.
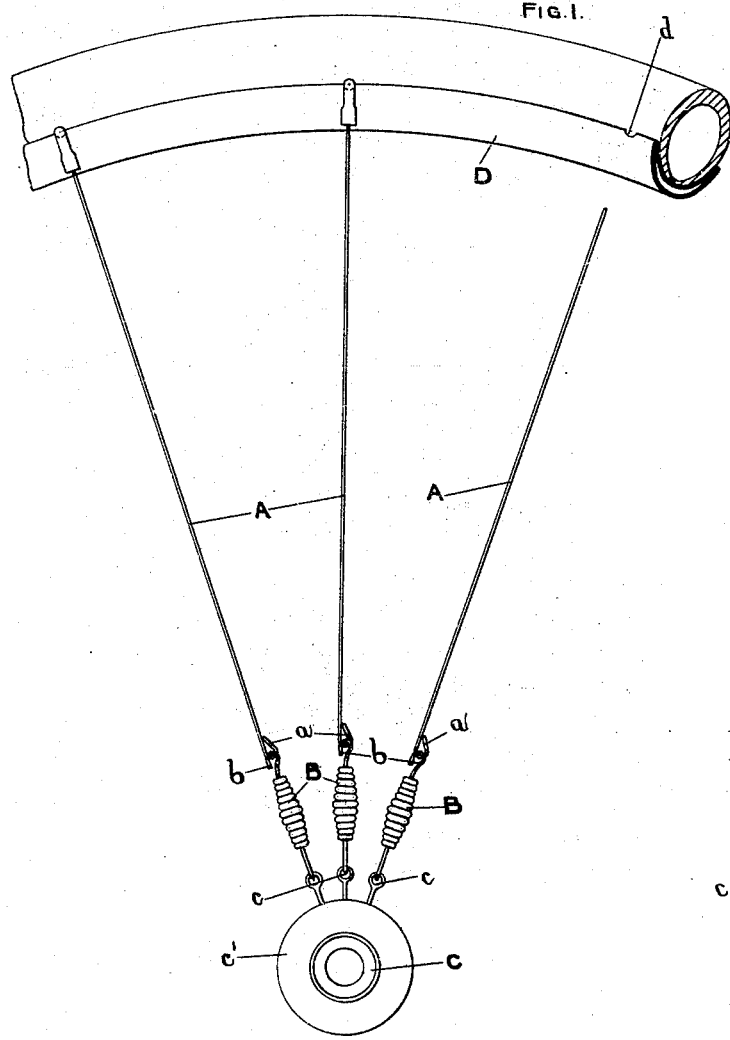
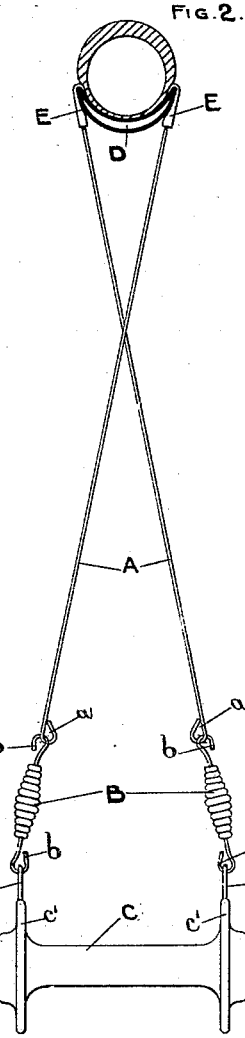
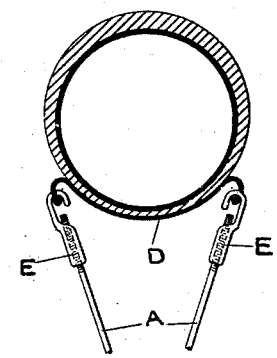
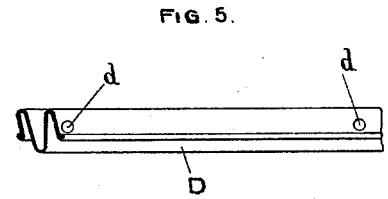
WITNESSES:
INVENTOR:
J. D. Everett.
Per. Robt. H. C. Phillips.
Attorney.
THE NATIONAL LITHOGRAPHING COMPANY,
WASHINGTON, D. C.

(No Model.)  2 Sheets—Sheet 2.
J. D. EVERETT.
VEHICLE WHEEL.
No. 509,883. Patented Dec. 5, 1893.
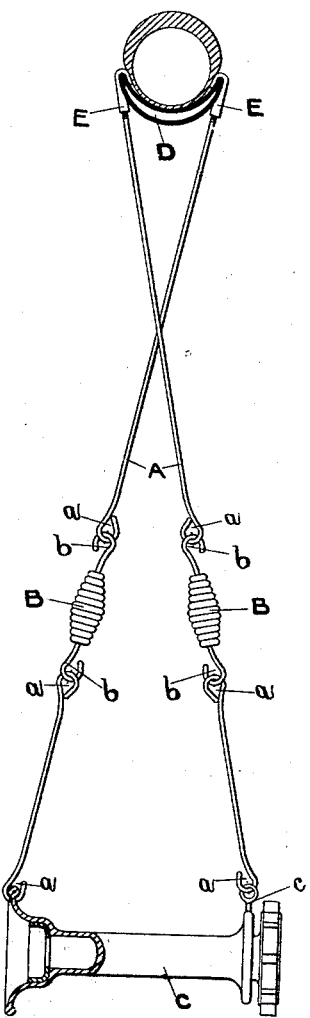
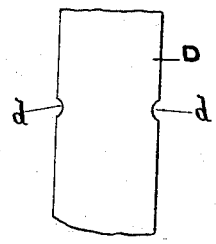
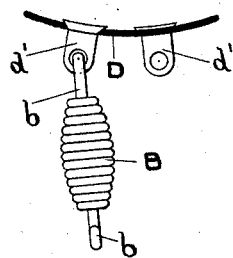
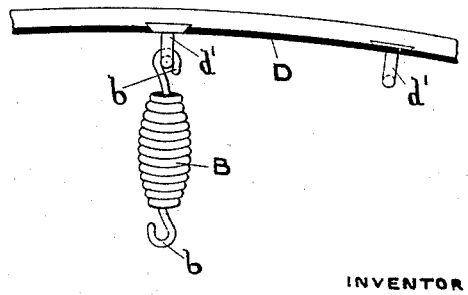
WITNESSES:
INVENTOR:
J. D. Everett.

UNITED STATES PATENT OFFICE.

JOSEPH DAVID EVERETT, OF BELFAST, IRELAND.

VEHICLE-WHEEL.

SPECIFICATION forming part of Letters Patent No. 509,883, dated December 5, 1893.

Application filed September 4, 1893. Serial No. 484,804. (No model.) Patented in England December 19, 1892, No. 23,341, and July 19, 1893, No. 13,981.

*To all whom it may concern:*

Be it known that I, JOSEPH DAVID EVERETT, a subject of the Queen of Great Britain, residing at Belfast, in the county of Antrim, Ireland, have invented a new and useful Improvement in Wheels for Cycles or other Road-Vehicles, (for which I have obtained patents in Great Britain, No. 23,341, bearing date December 19, 1892, and No. 13,981, bearing date July 19, 1893,) of which the following is a specification.

My invention relates to an improved construction of elastic or spring wheel suitable for cycles and other road vehicles, and it consists in interposing in each spoke at any convenient distance between its point of attachment to the hub and rim of the wheel a spring, the attachment of the several parts constituting the spoke to each other and to the hub and rim respectively being made by freely working joints, and in crossing the spokes so that the point of attachment of each to the wheel rim is on the opposite side of the wheel to its point of attachment to the hub, the object being to obtain a more perfect elastic or spring wheel than is at present known. I attain this end by the construction shown in the accompanying drawings, in which—

Figure 1 Sheet No. 1 is a broken view in side elevation of a wheel embodying my invention. Fig. 2 Sheet No. 1 is a broken view in transverse section thereof. Figs. 3 and 4 Sheet No. 1 are views in transverse section—on an enlarged scale—showing an alternative method of attaching the spokes to the wheel rim, and Fig. 5 Sheet No. 1 is a broken view in side elevation, also on an enlarged scale, of the wheel rim used therefor. Fig. 6 Sheet No. 2 is a view showing an alternative method of attaching the elastic spokes to the hub of the wheel. Figs. 7 and 8 Sheet No. 2 are views in broken side elevation and transverse section respectively showing an alternative method of attaching the elastic spokes to the wheel rim. Figs. 9 and 10 Sheet No. 2 illustrate a method of attaching the elastic spokes to wheel rims of a flat band section, and Fig. 11 Sheet No. 2 is a broken view in side elevation showing another form my invention may assume.

Throughout the several views similar letters denote similar parts.

The spokes A of the wheel each have at any convenient part of their length a spring B preferably of helical form. These springs B may be placed either at the hub end of the spoke A, as shown by Figs. 1, 2 and 6, at the rim end of the spoke as shown by Figs. 4, 7, and 8, or in its length as shown by Fig. 11. The ends of the springs B are attached to the spoke A and to the hub C or rim D, as the case may be, by means of hooks and eyes as shown, thus forming freely working joints to give the spokes the greatest possible freedom of movement and to avoid bending the spoke wires. The springs are preferably made with free hooks "$b$" at their ends, and eyes "$a$" are formed on the ends of the spokes A. When the springs are placed at the hub ends of the spokes the hooks "$b$" of the springs engage either with eye studs "$c$" screwed into the flanges "$c'$" of the hub C as shown by Figs. 1 and 2, or with holes "$c$" formed transversely through the flanges of the hub C as shown by Fig. 6, in which case a bead is formed on the periphery of each flange "$c'$" of the hub, and the edges of the holes "$c$" are well rounded so as to obtain the greatest freedom of movement for the spokes. The other ends of the spokes are threaded to screw in hook-shaped nipples E as shown by Figs. 1, 2, 3, and 11. These nipples are made of the shape shown on an enlarged scale by Fig. 3. The adjustment of the spokes is effected either by screwing them in the said nipples or by screwing the eye studs "$c$" into the flanges "$c'$" of the hub. If the rim D is of the ordinary crescent section the nipples E may engage with the edges of the rim D as shown by Figs. 1, 2, and 11, in which case round bottomed notches "$d$" are cut or formed in the edges of the rim at spaced intervals as shown by Fig. 1. If the rim D has recurved edges as shown by Fig. 3, holes "$d$" are formed in the recurved edges of the rim to receive the hooks of the nipples, the edges of the said holes being well rounded so as to obtain for the spokes the greatest freedom of movement.

If the rim D is of a flat section as shown by Figs. 9 and 10, eyes "$d'$" are formed at one end of lengths of wire each of which is passed transversely round the rim, as shown by Fig. 9, notches "d" being cut or formed in the edges thereof as shown by Fig. 10 to locate and retain the eyes in position. When the springs are placed at the rim ends of the spokes they may engage with the notches in the edges of the rim if the rim is of the ordinary crescent section as shown by Figs. 1 and 2, with holes in the edges of the rim if the rim has recurved edges as shown by Fig. 4, or with eyes carried by the rim if the rim is of a flat section as shown by Fig. 9. As an alternative method headed eyes "d'" may be passed through the rim as shown by Figs. 7 and 8 for either the hooks "b" of the springs B, or the hooked nipples E to engage with.

To obtain the greatest amount of resistance to lateral displacement the elastic spokes are crossed, i. e. the one end of each is attached either directly or indirectly to the rim of the wheel on the opposite side of the wheel to its point of attachment to the hub, and for the same reason the hub of the wheel should be wide. When there is room for the hub to project a long way beyond the plane of the rim on one side and but little room available on the other side, the spokes may be set at a larger angle with the plane of the rim (otherwise called the plane of the wheel) on the former side than on the latter; those spokes which make the larger angle with the plane of the wheel being constructed with weaker (i. e. more easily extended) springs than those on the other side and being also adjusted to lower tension. This construction is shown by Fig. 11.

My construction of spring wheel is suitable to be employed with any of the three kinds of cycle tires—pneumatic, cushion, and solid—at present in use.

As spring or elastic spokes constructed as hereinbefore set forth are exempt from bending stresses by the method of attachment employed, and from sudden jerks by the action of the springs, they may be made of wire of a much finer or thinner gage than is used for ordinary direct spokes.

By this construction of elastic wheel the following advantages are obtained: first, it permits of the spring being of different temper, material, and thickness, from the rest of the spoke, thereby facilitating the construction of the spoke with due allocation of strength and weight to different parts; secondly, it facilitates repair in case of a spring breaking, as a broken spring can be replaced by the roadside in two or three minutes, and the materials for such repair can be carried in the waistcoat pocket, and thirdly, it facilitates the attainment of the right degree of extensibility in the spokes; a matter essential for practical success.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

I am aware that spokes have already been made with springs formed in the lengths of wire forming the spokes, and also that wheels have been made with crossed spokes, and I do not therefore claim either spring or crossed spokes broadly, but What I do claim, and desire to secure by Letters Patent, is—

1. An elastic or spring wheel, consisting of a hub and wheel rim, and elastic spokes each of which consists of a wire spoke length and a separate and detachable spring (preferably of helical form), the said wire spoke lengths and the said springs being connected to each other and to the hub and rim by means of hooks and eyes, as and for the purpose set forth.

2. Spring spokes for wheels consisting of helical springs and wire spoke lengths attached to each other and to the hub and rim of the wheel by hooks and eyes, substantially as set forth.

3. An elastic or spring wheel, consisting of a hub and wheel rim, and elastic spokes each of which consists of a wire spoke length and a separate and detachable spring (preferably of helical form,) the said wire spoke lengths and the said springs being connected to each other and to the hub and rim by means of hooks and eyes, the spokes being crossed so that their points of attachment to the wheel rim are on the opposite side of the wheel to their points of attachment to the hub, as and for the purpose set forth.

4. An elastic or spring wheel, consisting of a hub and wheel rim, and elastic spokes each of which consists of a wire spoke length and a separate and detachable spring (preferably of helical form) the said wire spoke lengths and the said springs being connected to each other and to the hub and rim by means of hooks and eyes, the spokes being crossed so that their points of attachment to the wheel rim are on the opposite side of the wheel to their points of attachment to the hub, those on the one side of the wheel being longer than those on the other side thereof so that the said spokes on one side of the wheel make a greater angle with the plane of the wheel than the spokes on the other side thereof, as and for the purpose set forth.

5. In a wheel, the combination with a hub having eye studs screwed into, or transverse holes formed through, its flanges; of a rim having a series of notches cut or formed in its edges; of spokes consisting of lengths of wire and helical springs connected together by hooks and eyes, the one end of each spoke being screwed into a hook-shaped nipple adapted to engage with one of the notches in the edges of the wheel rim, and the other end of each spoke being attached by a hook to the eye studs or holes in the flanges of the hub by means of hooks, the said spokes being alternately crossed between their points of attachment to the rim and hub of the wheel, as set forth.

6. In a wheel the combination with a hub, having eye studs screwed into, or transverse holes formed through its flanges; of a rim having recurved edges in which are a series of holes; of spokes consisting of lengths of wire and helical springs connected together by hooks and eyes, the one end of each spoke being screwed into a hook-shaped nipple adapted to engage with the holes in the recurved edges of the wheel rim, and the other end of each spoke being attached by a hook to the eye studs or holes in the flanges of the hub by means of hooks, the said spokes being alternately crossed between their points of attachment to the rim and hub of the wheel, as set forth.

7. In a wheel the combination with a hub having eye studs screwed into, or transverse holes formed through, its flanges; of a rim of a flat band section having a series of wire eyes fixed to it; of spokes consisting of lengths of wire and helical springs connected together by hooks and eyes, the one end of each spoke being screwed into a hook-shaped nipple adapted to engage with one of the wire eyes fixed to the wheel rim, and the other end of each spoke being attached by a hook to the eye studs or holes in the flanges of the hub, the said spokes being alternately crossed between their points of attachment to the rim and hub of the wheel, as set forth.

8. In a wheel, the combination with a hub having eye studs screwed into, or transverse holes formed in, its flanges; of a rim having a series of holes adapted to receive headed eyes; of spokes consisting of lengths of wire screwed into hooked nipples and helical springs connected together by hooks and eyes, the one end of each spoke being attached by a hook to one of the headed eyes in the wheel rim, and the other end of each spoke being attached by a hook to the eye studs or holes in the flanges of the hub, the said spokes alternately being crossed between their points of attachment to the rim and hub of the wheel, as set forth.

9. In a wheel, the combination of a hub having either eye studs screwed into, or transverse holes formed through, its flanges; of a rim having a series either of notches or of holes in its edges; of spokes consisting of lengths of wire and helical springs connected together and to the wheel rim and hub by hook and eye joints, the spokes on one side of the wheel being placed at a greater angle with the plane of the wheel than those on the other side thereof, as set forth.

10. In a wheel, the combination with a hub having either eye studs screwed into, or transverse holes formed through its flanges; of a rim having a series of notches or holes in its edges; of spokes consisting of lengths of wire and helical springs connected to each other and to the wheel rim or hub by hook and eye joints, the said spokes being alternately crossed between their points of attachment to the wheel rim and hub, those on one side of the wheel being placed at a greater angle with the plane of the wheel than those on the other side thereof.

JOSEPH DAVID EVERETT.

Witnesses:
ALICE EVERETT,
WILFRED H. EVERETT.